May 28, 1929.  J. J. DENITSON, JR  1,714,852
PULVERIZER
Filed July 29, 1927  2 Sheets-Sheet 1
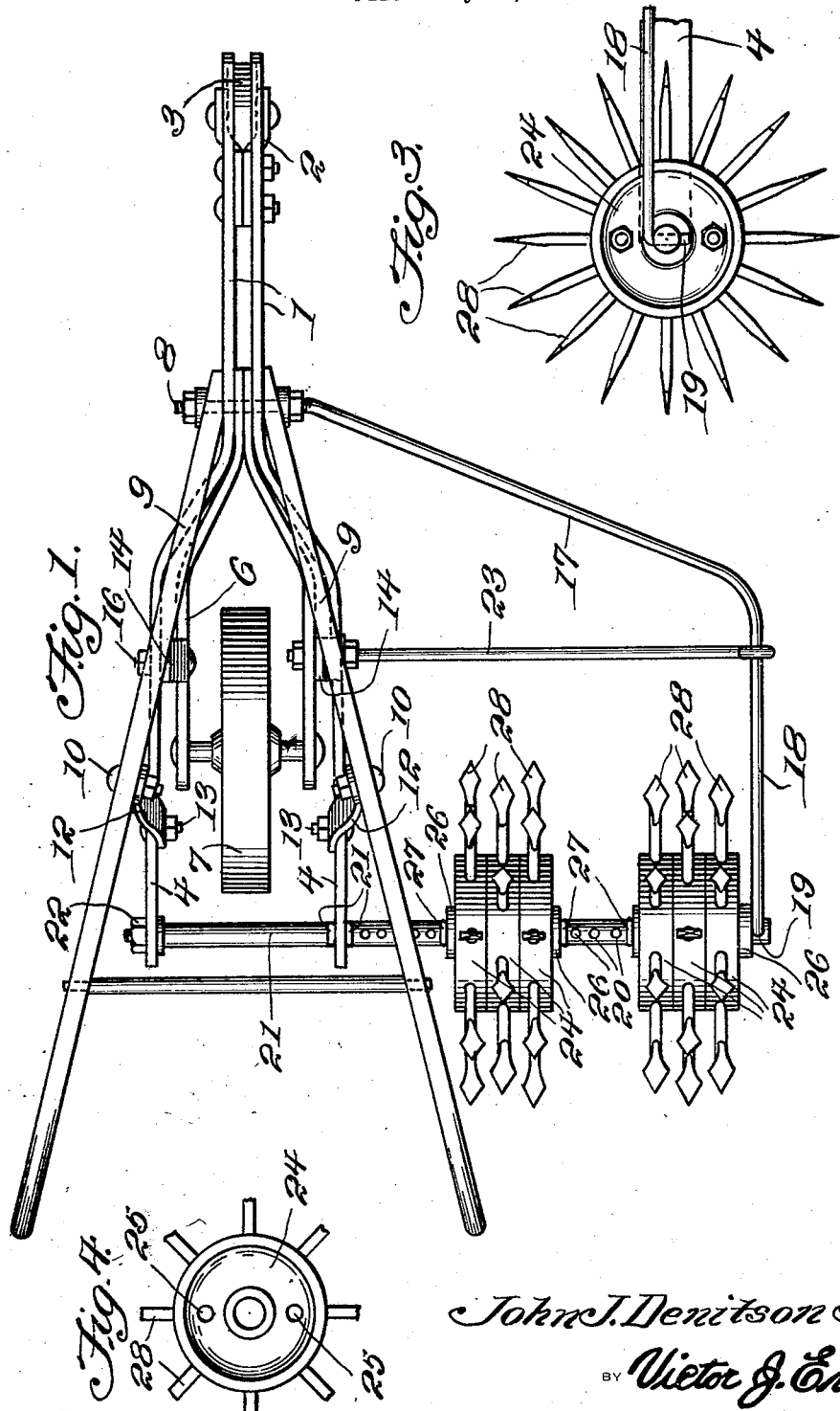

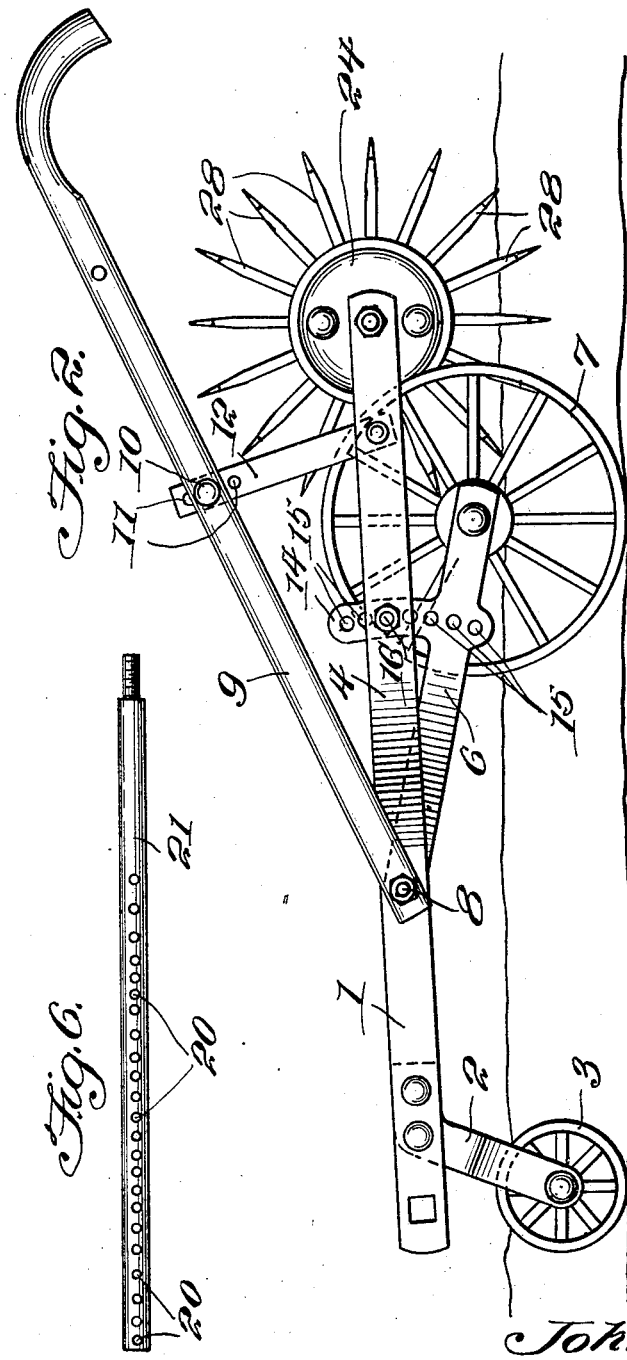
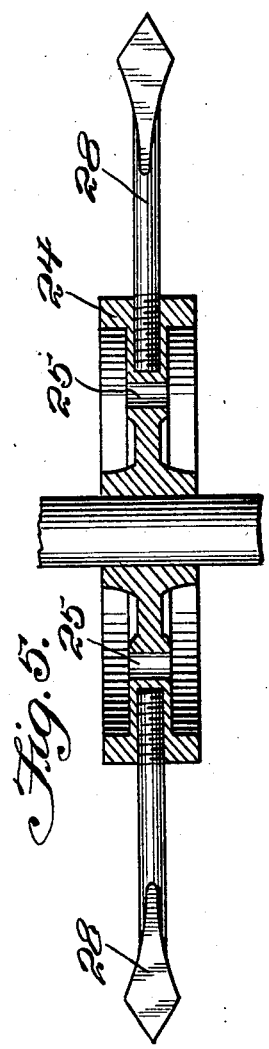

Patented May 28, 1929.

1,714,852

UNITED STATES PATENT OFFICE.

JOHN J. DENITSON, JR., OF CASTLE HAYNE, NORTH CAROLINA.

PULVERIZER.

Application filed July 29, 1927. Serial No. 209,384.

My present invention has reference to an agricultural implement and is in the nature of a weeder and cultivator.

The primary object is the provision of an implement for this purpose that includes a frame which is adjustably supported on a ground wheel and which has attached thereto and extending laterally therefrom an auxiliary frame and includes an axle upon which any desired number of hubs are arranged side by side and locked thereto, the connected series of hubs being disposed in spaced relation and the said hubs carrying staggeredly arranged series of spades or shovels which dig into the ground so that the land at the opposite sides of rows of plants can be thoroughly pulverized and all foreign growth removed therefrom.

A further object is the provision of an implement of this type which is designed to be pulled by a team of horses but which, of course, may be drawn by a tractor and which includes a main frame having front and rear wheels journaled thereon, the rear wheels being adjustable with respect to the frame, the said frame being provided with handles whereby the device may be properly guided and the main frame carrying an auxiliary frame of a particular and peculiar construction and which includes a shaft that is revoluble thereon but is held from longitudinal movement, while on the shaft there is arranged spaced series of hubs carrying radially disposed spades or shovels that enter the ground and which provide pulverizers, means being provided for properly spacing the pulverizers with respect to each other and for regulating the width thereof so that the shovels of the cultivator will straddle rows of plants and dig into and pulverize the ground at desired widths to the sides of the rows of plants.

To the attainment of the above broadly stated objects and others which will present themselves as the nature of the invention is better understood, the invention also consists in certain other novel features of construction, combination and operative association of parts, one satisfactory embodiment of which is disclosed by the accompanying drawings.

In the drawings:

Figure 1 is a top plan view of the improvement.

Figure 2 is a side elevation thereof.

Figure 3 is a fragmentary side elevation showing one of the pulverizers.

Figure 4 is an elevation looking toward the hub of one of the pulverizers.

Figure 5 is an enlarged detail sectional view approximately on the line 5—5 of Figure 4.

Figure 6 is a side elevation of the shaft or axle carried by the auxiliary or supplemental frame.

The main frame 1 is preferably constructed to include a pair of side members which have their rear portions spaced away from each other. Between the side members of the frame there is secured a depending mount 2 for the front wheel 3 of the frame. Between the widened end portions of the bars which constitute the sides of the frame and which portions for distinction are indicated by the numeral 4, there is the yoke portion 6 of the mount for the rear wheel 7. The spaced arms provided by the yoke are brought together and are pivoted, as at 8, between the closely related side portions of the frame. Also secured to the pivot 8 there are the handle bars 9 of the improvement, and these handle bars are sustained at adjustable elevations through the medium of pins 10 that pass through any one of a number of openings 11 in upstanding plates 12 that are fixed or otherwise secured by means 13 to the widened or yoked ends of the frame 1.

The arms of the yoke, constituting the mount for the wheel 7 are each formed with segmental plate extensions 13, each of which having any desired number of spaced openings 15 therethrough and passing through one of these openings and through the side portions 4 of the frame there are holding elements 16. The elements 10 and 16 are preferably in the nature of nuts and bolts. As far as the description has progressed it will be seen that the ground wheel 7 may be vertically adjusted with respect to the frame and effectively sustained at such a position and likewise that the handles 9 may be similarly adjusted and sustained.

The pivot member 8 is preferably in the nature of an elongated rod, and has both of its ends that contact with the frame engaged by nuts so that the said pivot is held from longitudinal movement. The pivot rod provides one of the important elements of what I will term the auxiliary frame of the improvement. This rod is extended laterally from the frame 1 for a considerable distance, as indicated by the numeral 17 and is bent upon itself and continued rearwardly in parallelism with the frame 1. This portion 18 of the rod or auxiliary frame member has its end bent to provide a hooked portion 19, and the said hooked portion is passed through one of a plurality of openings 20 arranged in longitudinal series on a shaft or axle 21. The shaft or axle passes through the spaced rear parts 4 of the frame 1, and stop elements 22 are arranged on the shaft or axle and contact with the said portions 4 of the main frame so that the axle 21 is held from longitudinal movement. A tie bar 23, having an outer eye end and an inner threaded end is connected between the arm 18 and the pivot rod 8 and one side of the main frame 1, as clearly disclosed by the drawings.

Slidably arranged on the axle 21 there are any desired number of disc-like members which I will term hubs and which I will designate in the drawings by the numeral 24. The hubs, of course, are of metal as is the remainder of the construction above described, except, perhaps, the handles 9. In the showing of the drawings three hubs 24 are arranged side by side and two sets of such hubs are disposed on the axle. Obviously any desired number of such hubs may be arranged against each other and revolubly mounted on the shaft or axle 21. The central or web portions of the hubs 24 have alining bolt openings 25 therethrough, and bolts engaged by nuts are passed through these openings for locking the series of hubs connected. On the shaft, at the opposite ends of the pulverizers which constitute the connected hubs 24, and spades or blades associated with such hubs which will hereinafter be described, there are stop collars 26, and passing through certain of the openings 20 of the shaft 21 and engaging with the outer faces of these collars there are cotter pins or similar elements 27.

The hubs 24 are provided with annular series of equidistantly spaced threaded openings in which are screwed the inner and straight ends of spades or shovels 28. The spades or shovels on the series of associated hubs are preferably disposed in staggered relation, so that each spade or shovel will separately enter the ground. The pulverizers are spaced away from each other to straddle rows of plants and the machine is guided by the handles 9 so that the device is properly propelled in a manner that will prevent the spades or shovels contacting with or injuring the plants.

My improvement is of a comparatively simple construction, but its advantages will be understood and appreciated by those skilled in the art to which such invention relates so that further detailed description is not believed required.

Having described the invention, I claim:—

In an agricultural implement, a main frame, a guide wheel mounted in the front of the main frame, a second wheel mounted for vertical adjustment adjacent to the end of the said frame, handles for the frame, means adjustably supporting the handles on the frame, an auxiliary frame secured to the main frame and extending beyond one side thereof, a shaft removably secured to the rear of the main frame and to the rear of the auxiliary frame, said shaft having series of apertures and the outer element of the auxiliary frame having a hooked end to be received in one of said apertures, spaced series of rotary pulverizers mounted on the shaft, removable stop collars on the shaft engageable with the outer hubs of the series of pulverizers, for holding the pulverizers from longitudinal movement on the shaft, one of said collars being engaged by the hooked end of the auxiliary frame and elements, such as cotter pins, passing through apertures in the shaft and engaging the remaining collars.

In testimony whereof I affix my signature.

JOHN J. DENITSON, Jr.